United States Patent
Mitchell

(10) Patent No.: US 7,359,050 B1
(45) Date of Patent: Apr. 15, 2008

(54) COMPACT TRIPLE PASS HYPERSPECTRAL IMAGER

(75) Inventor: Thomas A. Mitchell, Nazareth, PA (US)

(73) Assignee: Wavefront Research, Inc., Bethlehem, PA (US)

( * ) Notice: Subject to any disclaimer, the term of this patent is extended or adjusted under 35 U.S.C. 154(b) by 343 days.

(21) Appl. No.: 11/101,881

(22) Filed: Apr. 8, 2005

(51) Int. Cl.
*G01J 3/28* (2006.01)

(52) U.S. Cl. ...................................... 356/328

(58) Field of Classification Search ............ None
See application file for complete search history.

(56) References Cited

U.S. PATENT DOCUMENTS

| | | | | |
|---|---|---|---|---|
| 3,554,647 A | * | 1/1971 | Paine | 356/302 |
| 3,711,185 A | * | 1/1973 | McKinley | 359/731 |
| 3,748,015 A | | 7/1973 | Offner | 350/55 |
| 5,534,700 A | * | 7/1996 | McGlynn et al. | 250/353 |
| 5,717,487 A | | 2/1998 | Davies | 356/328 |
| 5,768,040 A | * | 6/1998 | Macenka et al. | 359/859 |
| 6,310,347 B1 | * | 10/2001 | Shu et al. | 250/339.07 |
| 2004/0156048 A1 | * | 8/2004 | Mitchell | 356/305 |

OTHER PUBLICATIONS

Gavin, Maurice. "WPO—A Reflective Spectroscopic Slit & Its Application." Journal of the BAA v91 #3 p. 261 (1981): <http://www.astroman.fsnet.co.uk/needle1.htm>.*
NASA Contract No. NAS 7-918 Technical Support Package on "Low Distortion Imaging Spectrometers" for NASA Tech Brief, vol. 23, No. 3, Mar. 1999.

* cited by examiner

*Primary Examiner*—Layla G. Lauchman
*Assistant Examiner*—Jonathan Skovholt
(74) *Attorney, Agent, or Firm*—Burns & Levinson LLP; Jacob N. Erlich; Orlando Lopez

(57) ABSTRACT

A compact, triple pass hyperspectral imager (spectrometer). The hyperspectral imager (imaging system) of this invention includes an optical sub-system, a reflective slit element, a reflective dispersive element located substantially at a front plane, the front plane being located on the source side of the optical sub-system, and, a detecting element located substantially at an image surface.

14 Claims, 12 Drawing Sheets

COMPACT TRIPLE PASS HYPERSPECTRAL IMAGER

BACKGROUND OF THE INVENTION

This invention relates generally to hyperspectral imagers or imaging spectrometers, and, more particularly, to more compact hyperspectral imager designs.

A hyperspectral imager is a conventional device that is commonly used to examine the spectral, or wavelength dependent, content of light. Light emitted or reflected by a given object or scene is imaged by some means onto an aperture, usually a slit element that transmits a single line image from the object or scene. A spectrometer then re-images this light to another location while dispersing this light according to its wavelength in a direction orthogonal to the orientation of the slit element, where it can readily be observed or recorded.

Because every material has a unique spectral signature, the spectrometer has become a very useful scientific tool in a broad range of scientific and industrial applications including, but not limited to, the monitoring of regional and global environmental conditions, the identification of both airborne and terrestrial objects and threats in surveillance imagery for military applications, the assessment of unknown substances in forensic applications, the precise characterization of color spectra in colorimetry, and in the assessment of crop health and irrigation scheduling in the farming industry.

Current physically compact spectrometer design forms, like the Offner and Dyson configurations, require curved dispersing elements. These can be very difficult and costly to build, particularly in the long-wave infrared wavelengths (7.5 to 14 micrometers).

Current hyperspectral imager designs are either too large in size for many applications, including but not limited to, unmanned aircraft surveillance and forensic fieldwork, or their dispersing elements are too complex and costly to fabricate for commercial applications, or they do not provide enough spatial and spectral imaging quality to meet the required system performance, or they cannot provide a combination of these characteristics simultaneously. For example, consider some applications of hyperspectral imaging in which it is desirable, and not available in current designs, to have an optical system that simultaneously possesses a large spectral bandwidth such as the combined visible, near infrared and shortwave infrared bands, a large spatial field so that a large ground area can be covered with a single fly-over, high spatial and spectral resolutions so that small spatial and spectral features can be resolved, negligible spectral and spatial distortions to facilitate recognition algorithms, a very small size and mass so that the system can be transported in an unmanned aerial vehicles (UAV) or be man-portable, and is readily manufacturable from low-cost components.

There is therefore a need for a spectrometer design that is more compact in physical size than current spectrometers.

Furthermore, there is also a need for a spectrometer design that is lower in mass than current spectrometers.

Furthermore, there is also a need for a spectrometer design that utilizes less complex and costly dispersing elements.

Furthermore, there is also a need for a spectrometer design that provides a high degree of spatial and spectral image quality that is relatively free of spatial and spectral image distortions.

Furthermore, there is also a need for a spectrometer design that provides larger spatial and spectral fields than current spectrometers.

Still further, there is also a need for a spectrometer design that provides a combination of the characteristics described above with superior trade-offs than have been previously attainable.

BRIEF SUMMARY OF THE INVENTION

The needs set forth above as well as further and other needs and advantages of the present invention are achieved by the embodiments of the invention described herein below.

A compact, triple pass hyperspectral imager (spectrometer) is disclosed.

The hyperspectral imager (imaging system) of this invention includes an optical sub-system, a reflective slit element, a reflective dispersive element located substantially at a front plane, the front plane being located on the source side of the optical sub-system, and, a detecting element located substantially at an image surface. The optical sub-system is capable of imaging, onto the reflective slit element, electromagnetic radiation emanating from a source. The optical sub-system is also capable of substantially collimating, at the front plane, electromagnetic radiation emanating from the reflective slit element and of imaging, at the image surface, reflected, dispersed electromagnetic radiation from the reflective dispersive element. The optical sub-system is located between the front plane and the image surface. The detecting element is capable of detecting reflected dispersed electromagnetic radiation reflected from the reflective dispersive element.

The present invention does not require for a curved dispersion element, and, in one embodiment, utilizes plane dispersing elements including, but not limited to, simple planar blazed ruled diffraction gratings.

The present invention makes use of the same optical system as both the imager and spectrometer. In this manner, the system of this invention renders compact hyperspectral imagers, and due to the symmetry of using this design form in triple pass, a degree of natural transverse aberration correction can be achieved. This natural correction of coma, distortion, and lateral color aberrations in the present invention, in conjunction with the compact nature of a triple pass system configuration and the elimination of curved dispersing elements, renders triple pass hyperspectral imagers of the present invention more compact, lower in mass, and less costly than current designs, while maintaining superior spatial and spectral image quality.

For a better understanding of the present invention, together with other and further objects thereof, reference is made to the accompanying drawings and detailed description and its scope will be pointed out in the appended claims.

DETAILED DESCRIPTION OF THE INVENTION

Compact, triple pass hyperspectral imaging systems (spectrometers or hyperspectral imagers) are disclosed hereinbelow.

Figure 1:
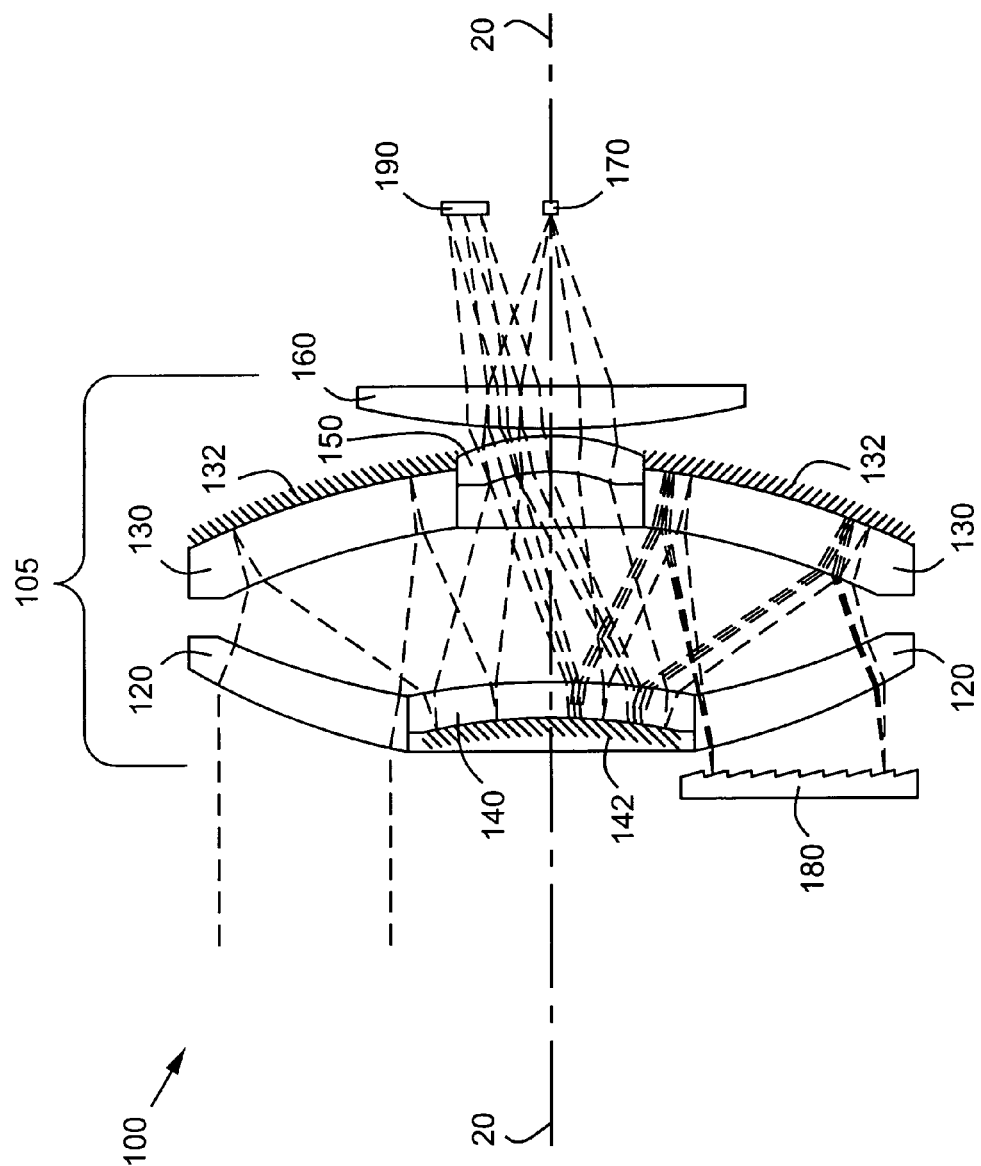
FIG. 1 is a schematic sectional view of an embodiment of a hyperspectral imager of this invention, taken along the optical axis in the plane parallel to the direction of dispersion.

Reference is made to FIG. 1, which is a schematic sectional view of an embodiment of this invention 100, taken along the optical axis 20 in the plane parallel to the direction of dispersion. In the operation of this embodiment, electromagnetic radiation, typically in the ultraviolet, visible, and/or infrared bands, hereinafter referred to generally as light, emitted or reflected by a given object, either real or virtual, hereinafter also referred to as a source, is substantially imaged (substantially focused in one embodiment) through the un-obscured portion of an optical sub-system 105 comprised of a combination of optical elements, in this embodiment consisting of refractive elements 120, 130, 140, 150, and 160 with elements 130 and 140 comprised of reflective surfaces 132 and 142 respectively, onto a reflective slit or other method of extracting a line image for use as input to a spectrometer, hereinafter referred to generally as a reflective slit element 170. The reflected light, emanating from the reflective slit element, is then substantially collimated as it passes a second time through the same optical sub-system 105 onto a reflective dispersing element or any method of angularly separating light energy according to its wavelength, hereinafter referred to generally as a dispersing element 180. The plane at which the dispersing element 180 is substantially located is hereinafter referred to as the front plane. This dispersed light is then substantially imaged (substantially focused in one embodiment) as it passes a third time through the same optical sub-system 105 onto an image surface 190. In some applications, although not a limitation of this invention, a CCD array, phosphorescent screen, photographic film, microbolometer array, or other means of detecting light energy, hereinafter referred to generally as a detecting element, is substantially located at the image surface 190 and detects the angularly separated electromagnetic radiation.

Figure 2A:
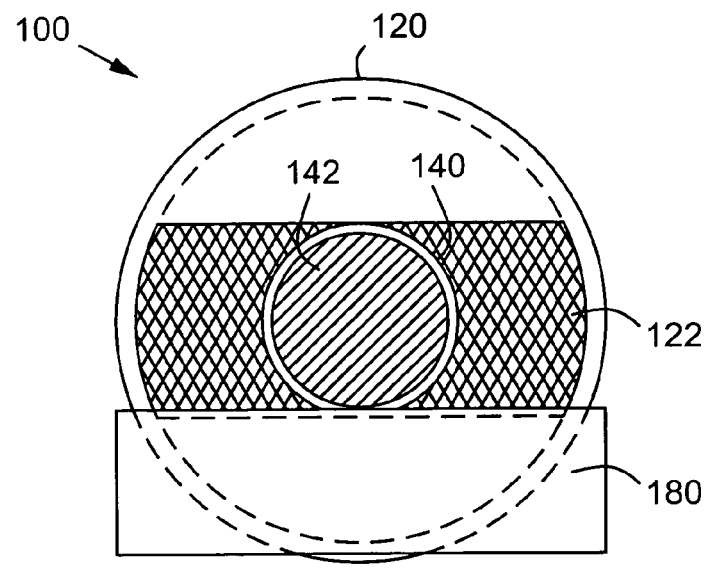
FIGS. 2A-2B are schematic sectional views of the embodiment of this invention illustrated in FIG. 1, taken along a plane perpendicular to the optical axis as viewed from the front (FIG. 2A) and taken along the optical axis in the plane parallel to the direction of dispersion (FIG. 2B)

Reference is made to FIG. 2A, which is a schematic sectional view of this same embodiment 100, taken along a plane perpendicular to the optical axis 20 as viewed from the front. In operation, the reflective surface 142 of optical element 140 obscures light from entering the optical system. This obscuration is extended by an additional obscuration 122 added to one of the surfaces of optical element 120 to further obscure light from entering the optical system. The dispersing element 180 located in front of the optical element 120 further obscures light from entering the optical system.

Figure 2B:
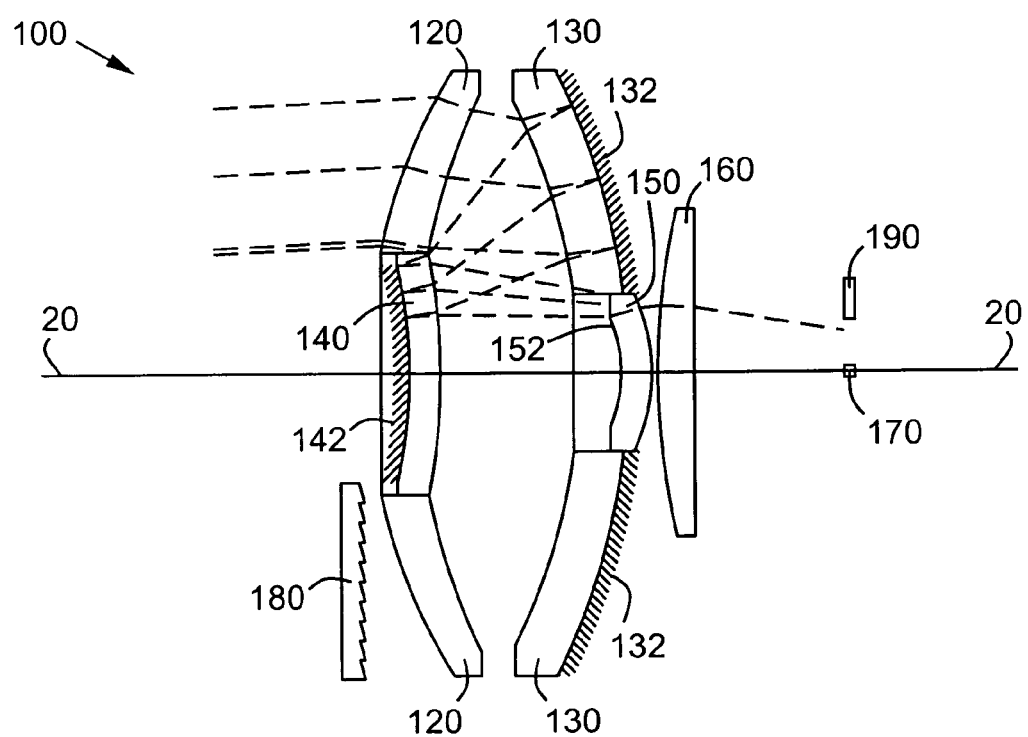

Reference is made to FIG. 2B, which is a schematic sectional view of this same embodiment 100, taken along the optical axis 20 in the plane parallel to the direction of dispersion. In operation, light incident on the optical system from an angular direction that does not focus to the slit element 170 is sufficiently blocked by the obscuration 122, reflective surface 142, dispersing element 180, and the physical aperture 152 of the optical element 150 such that no light is directly focused onto the image surface 190 prior to being dispersed by the dispersing element 180.

Figure 3A:
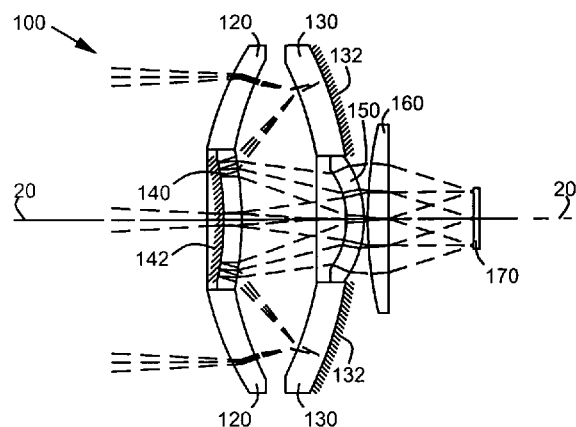
FIGS. 3A-3C are schematic sectional views of the embodiment of this invention illustrated in FIG. 1, taken along the optical axis in the plane perpendicular to the direction of dispersion.
Figure 3B:
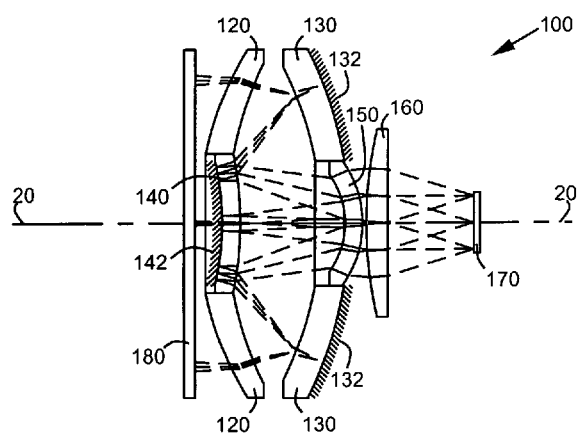
Figure 3C:
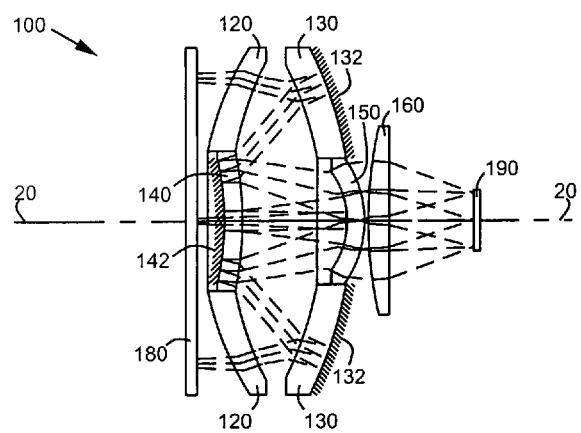

Reference is made to FIGS. 3A-3C, which are schematic sectional views of this same embodiment 100, taken along the optical axis 20 in the plane perpendicular to the direction of dispersion. In operation and referring to FIG. 3A, light is imaged through the un-obscured portion of the optical sub-system 105 onto the reflective slit element 170. Referring to FIG. 3B, the reflected light is then substantially collimated as it passes a second time through the same optical sub-system 105 onto the reflective dispersing element 180. Referring to FIG. 3C, the dispersed light, from the reflective dispersing element 180, is then substantially imaged as it passes a third time through the same optical sub-system 105 onto the image surface 190.

Figure 4:
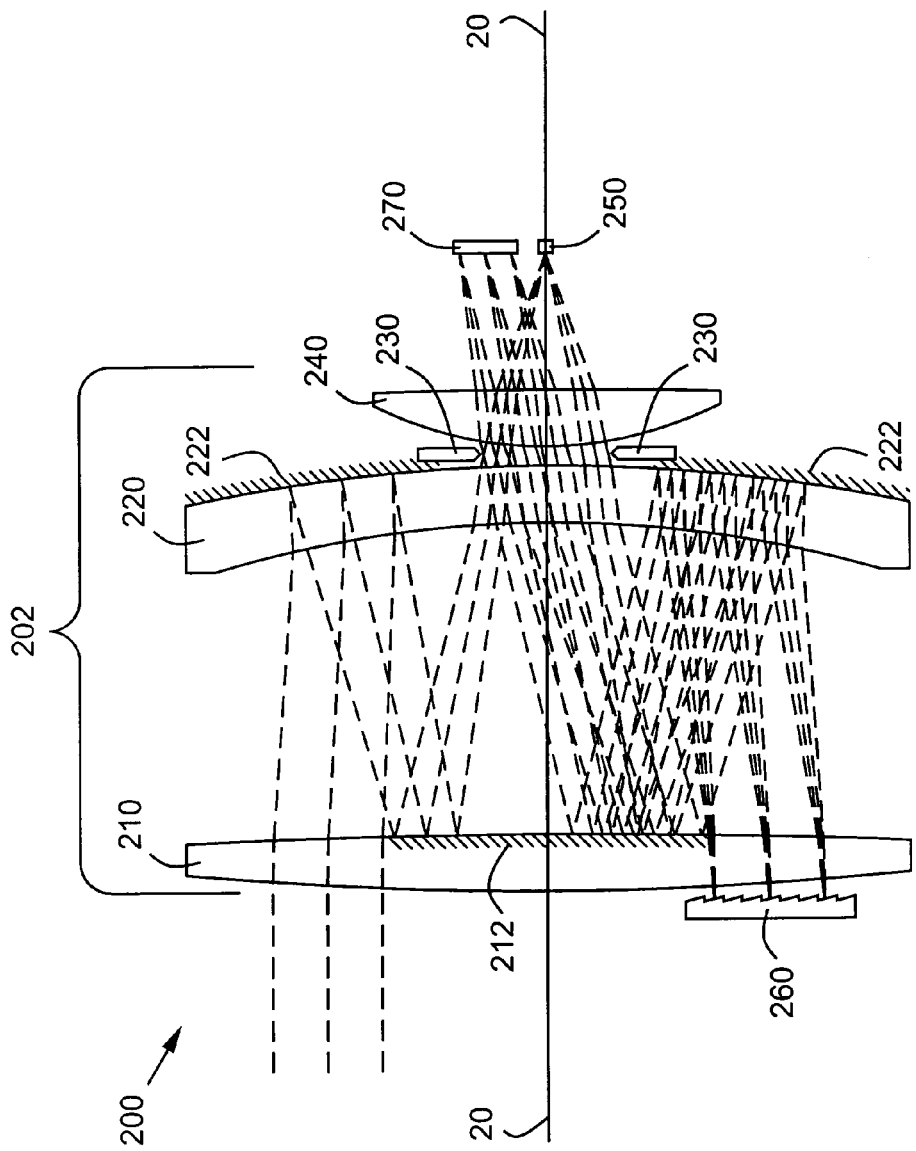
FIG. 4 is a schematic sectional view of another embodiment of a hyperspectral imager of this invention, taken along the optical axis in the plane parallel to the direction of dispersion.

Reference is made to FIG. 4, which is a schematic sectional view of a further embodiment of this invention 200, taken along the optical axis 20 in the plane parallel to the direction of dispersion. In the operation of this embodiment, light is imaged through the un-obscured portion of an optical sub-system 205, in this embodiment a catadioptric imager, comprised of a combination of optical elements, in this embodiment consisting of refractive elements 210, 220, and 240 with elements 210 and 220 comprised of reflective surfaces 212 and 222 respectively, onto a reflective slit element 250. The reflected light is then substantially collimated as it passes a second time through the same optical sub-system 205 onto a reflective dispersing element 260. The dispersed light from the reflective dispersing element 260 is then imaged as it passes a third time through the same optical sub-system 205 onto an image surface 270. In some applications, although not a limitation of this invention, a CCD array, phosphorescent screen, photographic film, microbolometer array, or other means of detecting light energy, hereinafter referred to generally as a detecting element, is substantially located at the image surface 270 and detects the angularly separated electromagnetic radiation.

Figure 5A:
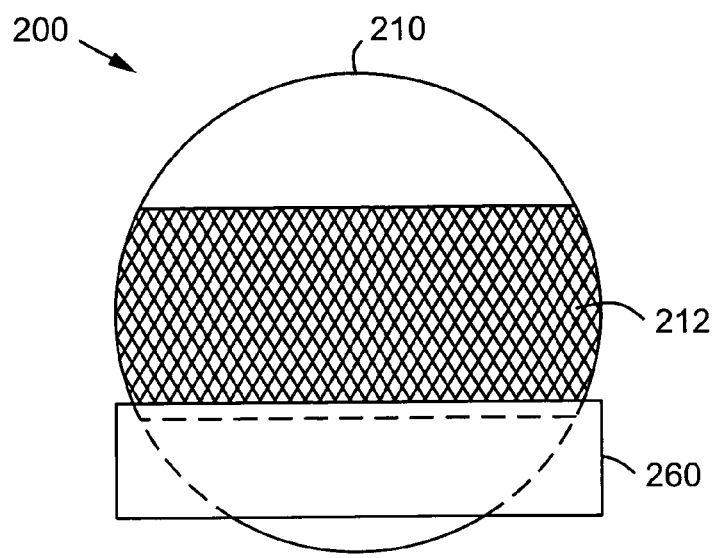
FIGS. 5A-5B are schematic sectional views of the embodiment of this invention illustrated in FIG. 4, taken along a plane perpendicular to the optical axis as viewed from the front (FIG. 5A) and taken along the optical axis in the plane parallel to the direction of dispersion (FIG. 5B)

Reference is made to FIG. 5A, which is a schematic sectional view of this same embodiment 200, taken along a plane perpendicular to the optical axis 20 as viewed from the front. In operation, the reflective surface 212 of optical element 210 obscures light from entering the optical system. The dispersing element 260 located in front of the optical element 210 further obscures light from entering the optical system.

Figure 5B:
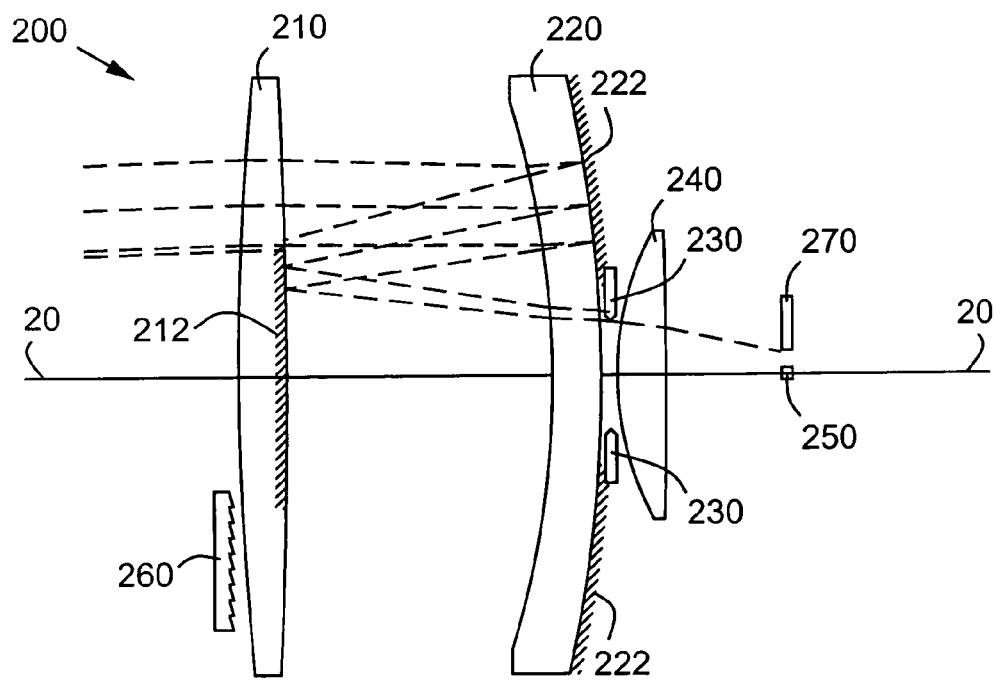

Reference is made to FIG. 5B, which is a schematic sectional view or this same embodiment 200, taken along the optical axis 20 in the plane parallel to the direction of dispersion. In operation, light incident on the optical system from an angular direction that does not focus to the slit element 250 is sufficiently blocked by the reflective surface 212, dispersing element 260, and the field limiting aperture 230 such that no light is directly focused onto the detecting element 270 prior to being dispersed by the dispersing element 260.

Figure 6A:
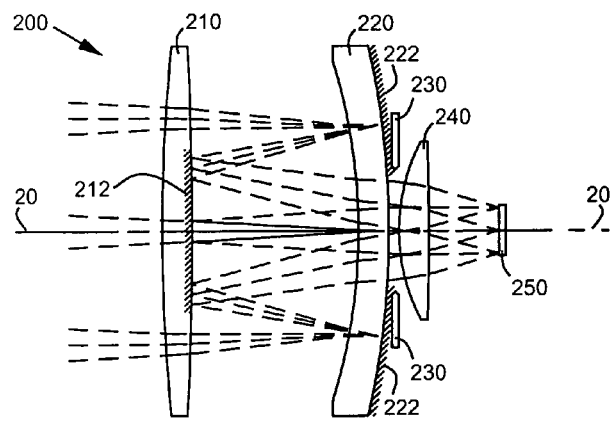
FIGS. 6A-6C are schematic sectional views of the embodiment of this invention illustrated in FIG. 4, taken along the optical axis in the plane perpendicular to the direction of dispersion.
Figure 6B:
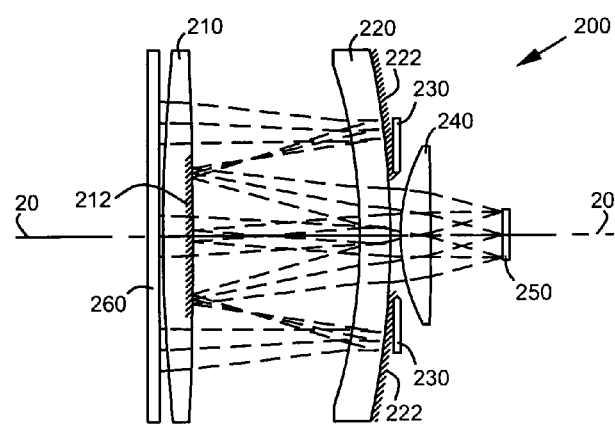
Figure 6C:
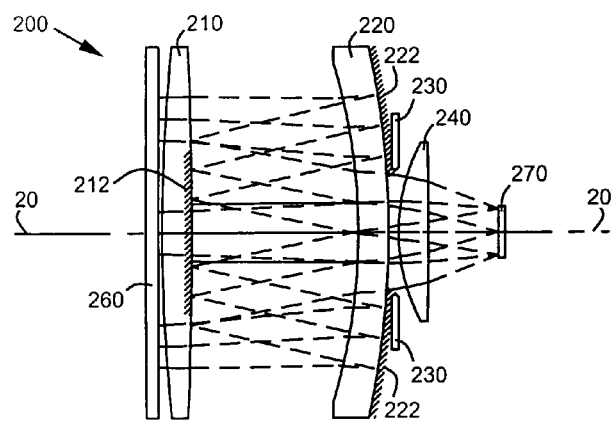

Reference is made to FIGS. 6A-6C, which are schematic sectional view of this same embodiment 200, taken along the optical axis 20 in the plane perpendicular to the direction of dispersion. In operation and referring to FIG. 6A, light is imaged through the un-obscured portion of the optical sub-system 205 onto the reflective slit element 250. Referring to FIG. 6B, the reflected light is then substantially collimated as it passes a second time through the same optical sub-system 205 onto the reflective dispersing element 260. Referring to FIG. 6C, the dispersed light from the reflective dispersing element 260 is then imaged as it passes a third time through the same optical sub-system 205 onto the image surface 270.

In the two embodiments of the system of this invention 100 and 200 described above, the optical sub-systems 105 and 205 are similar catadioptric optical sub-systems and operate in a similar manner.

Figure 7:
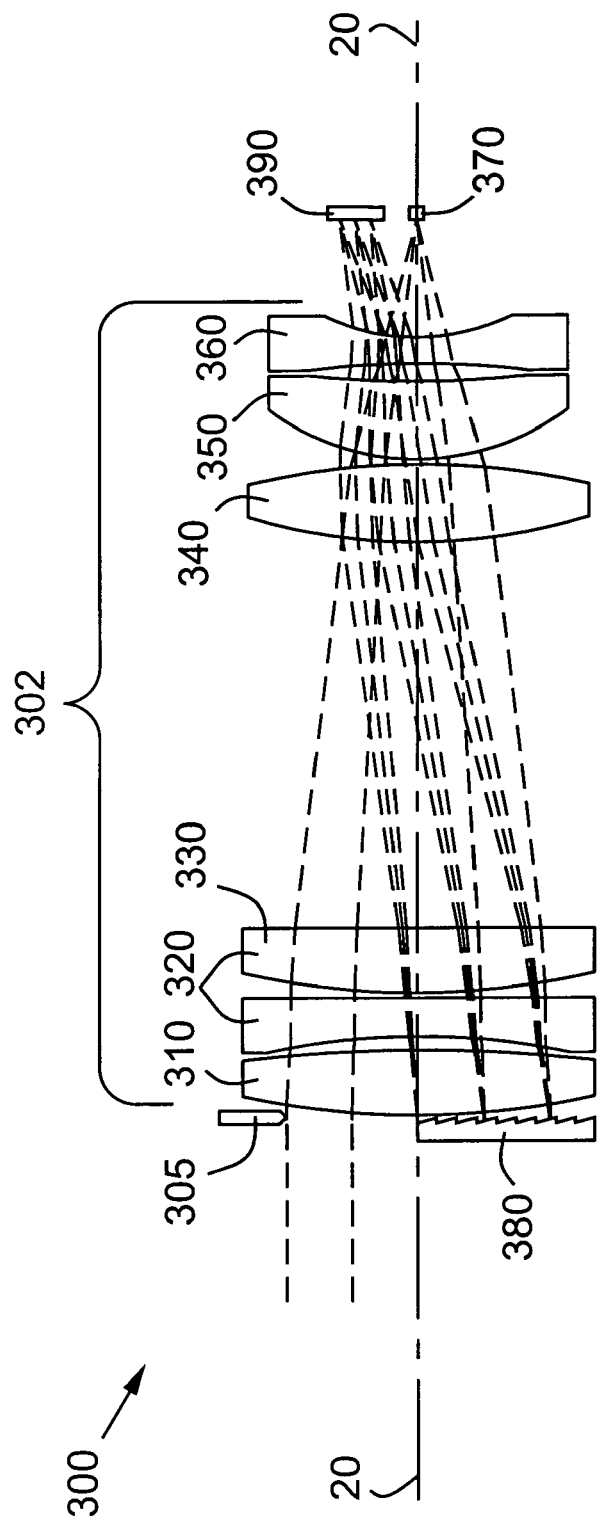
FIG. 7 is a schematic sectional view of a further embodiment of a hyperspectral imager of this invention, taken along the optical axis in the plane parallel to the direction of dispersion.

Reference is made to FIG. 7, which is a schematic sectional view of a further embodiment of this invention 300, taken along the optical axis 20 in the plane parallel to the direction of dispersion. In the operation of this embodiment, light is imaged through the un-obscured portion of an optical sub-system 305, in this embodiment a Petzval-type lens system, comprised of a combination of optical elements, in this embodiment consisting of refractive elements 310, 320, 330, 340, 350, and 360, onto a reflective slit element 370. The reflected light is then substantially collimated as it passes a second time through the same optical sub-system 305 onto a reflective dispersing element 380. The dispersed light from the reflective dispersing element 380 is then substantially imaged as it passes a third time through the same optical sub-system 305 onto an image surface 390. In some applications, although not a limitation of this invention, a CCD array, phosphorescent screen, photographic film, microbolometer array, or other means of detecting light energy, hereinafter referred to generally as a detecting element, is substantially located at the image surface 390 and detects the angularly separated electromagnetic radiation.

Figure 8A:
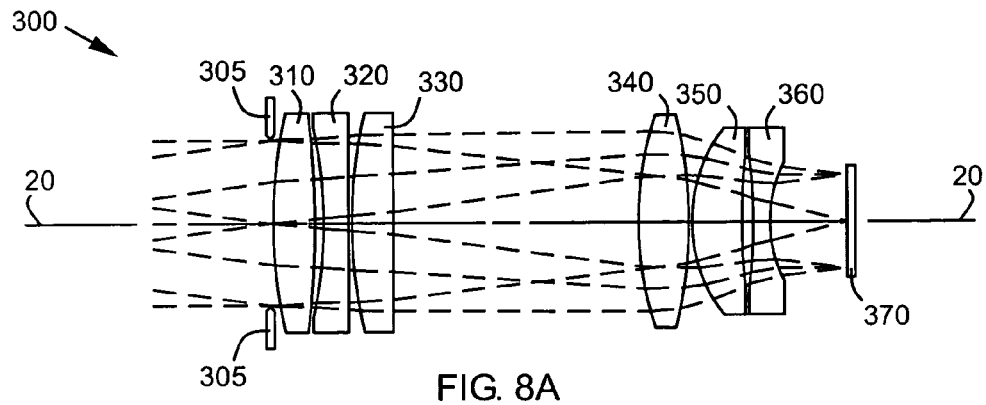
FIGS. 8A-8C are schematic sectional views of the embodiment of this invention illustrated in FIG. 7, taken along the optical axis in the plane perpendicular to the direction of dispersion.
Figure 8B:
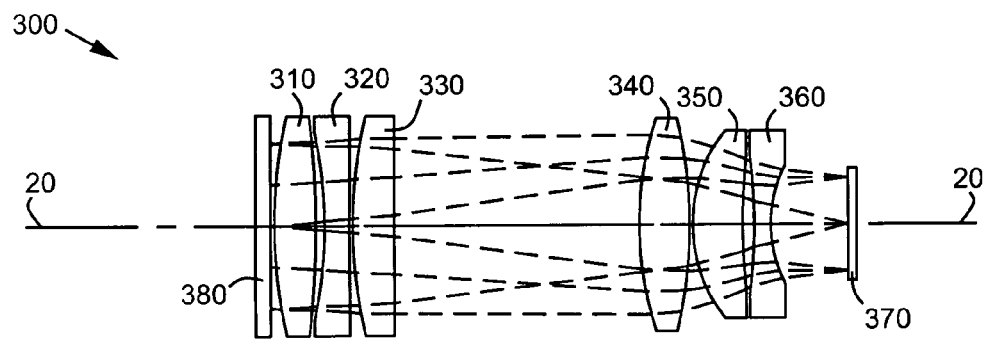
Figure 8C:
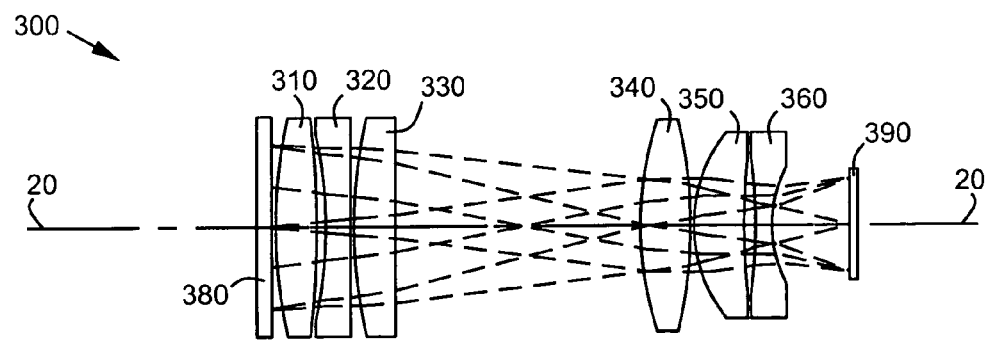

Reference is made to FIGS. 8A-8C, which are schematic sectional view of this same embodiment 300, taken along the optical axis 20 in the plane perpendicular to the direction of dispersion. The reflective dispersive element 380 is positioned so as to obscure a portion of the light emitted or reflected by the object. In operation and referring to FIG. 8A, light is imaged through the un-obscured portion of the optical sub-system 305 onto the reflective slit element 370. An optical stop 308, in this embodiment optically disposed between the source and the optical sub-system 302, obscures the outer diameter of the system.

Referring to FIG. 8B, the reflected light is then substantially collimated as it passes a second time through the same optical sub-system 305 onto the reflective dispersing element 380. Referring to FIG. 8C, the dispersed light from the reflective dispersing element 380 is then imaged as it passes a third time through the same optical sub-system 305 onto the detecting element 390.

Figure 9A:
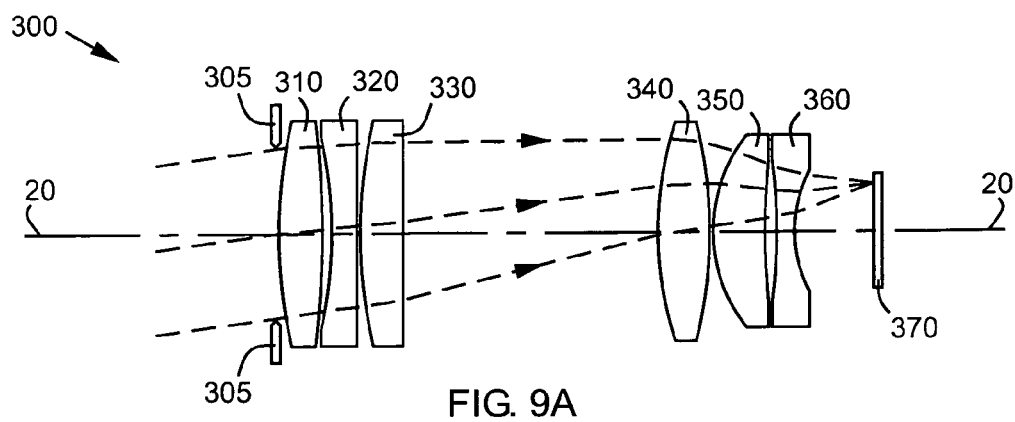
FIGS. 9A-9C are schematic sectional views of the embodiment of this invention illustrated in FIG. 7, taken along the optical axis in the plane perpendicular to the direction of dispersion showing additional detail for a single off-axis spatial field position.
Figure 9B:
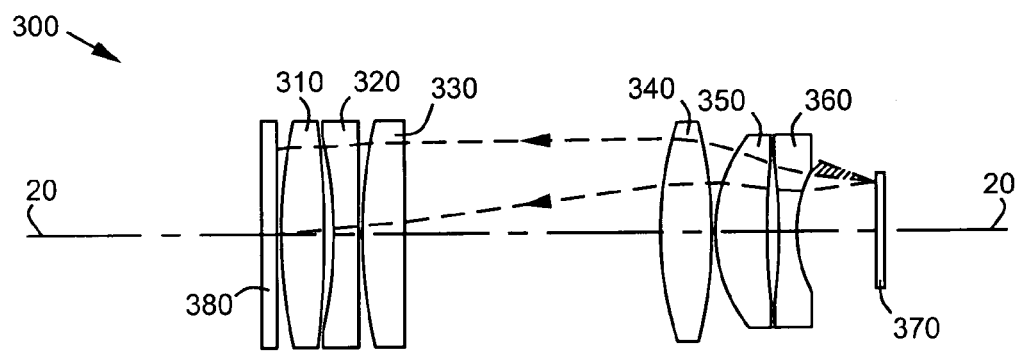
Figure 9C:
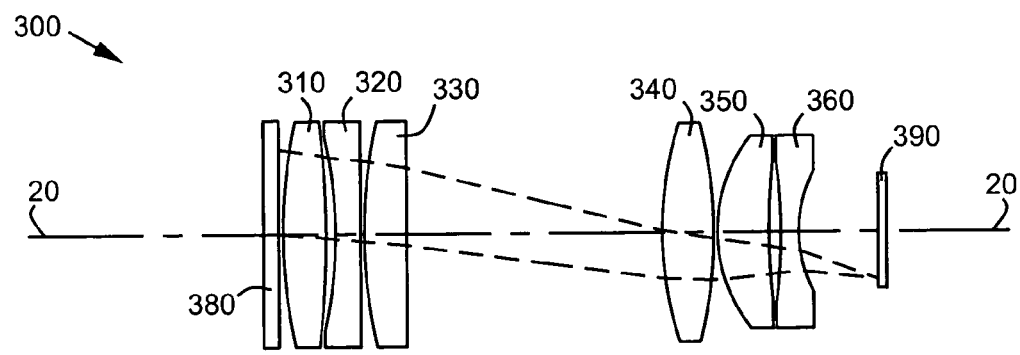

Reference is made to FIGS. 9A-9C, which are schematic sectional views of this same embodiment 300, taken along the optical axis 20 in the plane perpendicular to the direction of dispersion. In operation and referring to FIG. 9A, light incident on the optical system from an angular direction non-parallel to the optical axis 20 is imaged through the un-obscured portion of the optical sub-system onto the reflective slit element 370. Referring to FIG. 9B, a portion of the reflected light is obscured by the physical apertures of the optical elements, while the remaining reflected light is then substantially collimated as it passes a second time through the same optical sub-system 305 onto the reflective dispersing element 380. Referring to FIG. 9C, this dispersed light is then imaged as it passes a third time through the same optical sub-system 305 onto the imaging plane 390.

Figure 10:
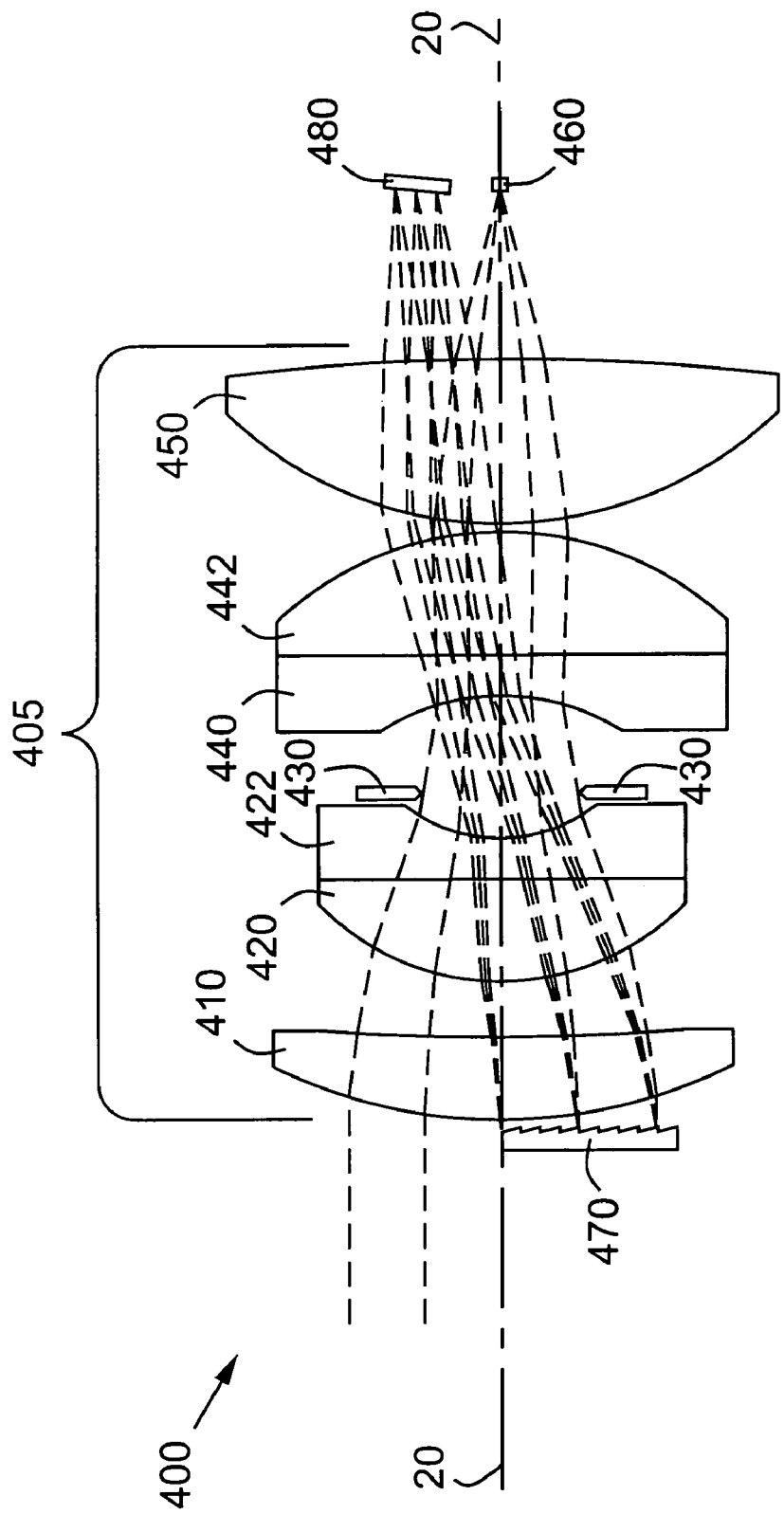
FIG. 10 is a schematic sectional view of yet another embodiment of a hyperspectral imager of this invention, taken along the optical axis in the plane parallel to the direction of dispersion.

Reference is made to FIG. 10, which is a schematic sectional view of a still further embodiment of this invention 400, taken along the optical axis 20 in the plane parallel to the direction of dispersion. In the operation of this embodiment, light is imaged through the un-obscured portion of an optical sub-system 405, in this embodiment a Double Gauss-type lens system, comprised of a combination of optical elements, in this embodiment consisting of refractive elements 410, 420, 422, 440, 442, and 450, onto a reflective slit element 460. The reflected light is then substantially collimated as it passes a second time through a second portion of the same optical sub-system 405 onto a reflective dispersing element 470. The dispersed light from the reflective dispersing element 470 is then imaged as it passes a third time through the same optical sub-system 405 onto an image surface 480.

Figure 11A:
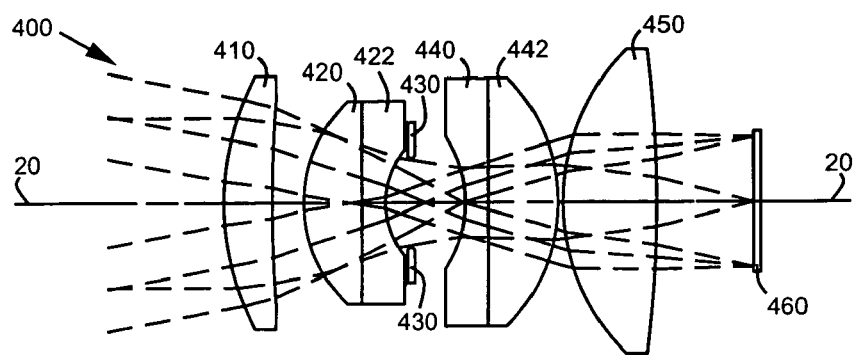
FIGS. 11A-11C are schematic sectional views of the embodiment of the present invention illustrated in FIG. 10, taken along the optical axis in the plane perpendicular to the direction of dispersion; and, FIGS. 12A-12C are schematic sectional views of the embodiment of the present invention illustrated in FIG. 10, taken along the optical axis in the plane perpendicular to the direction of dispersion showing additional detail for a single off-axis spatial field position.
Figure 11B:
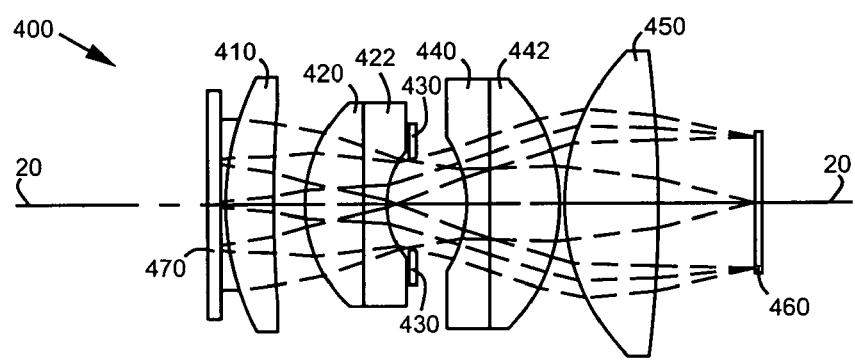
Figure 11C:
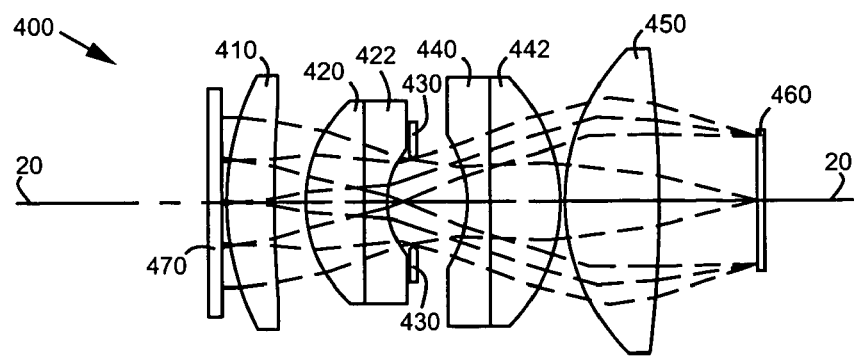

Reference is made to FIGS. 11A-11C, which are schematic sectional view of this same embodiment 400, taken along the optical axis 20 in the plane perpendicular to the direction of dispersion. In operation and referring to FIG. 11A, light is imaged through the un-obscured portion of the optical sub-system 405 onto the reflective slit element 460. Referring to FIG. 11B, the reflected light is then substantially collimated as it passes a second time through the same optical sub-system 405 onto the reflective dispersing element 470. Referring to FIG. 11C, this dispersed light is then imaged as it passes a third time through the same optical sub-system 405 onto the image surface 480.

Figure 12A:
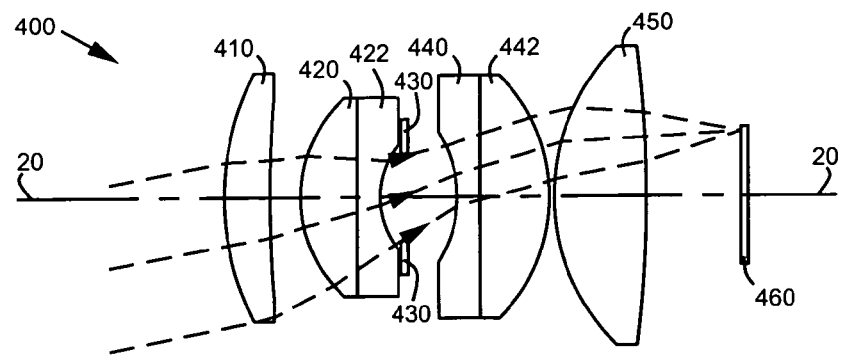
Figure 12B:
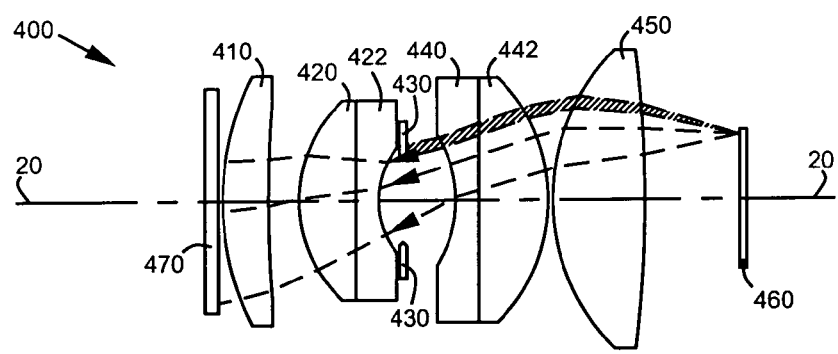
Figure 12C:
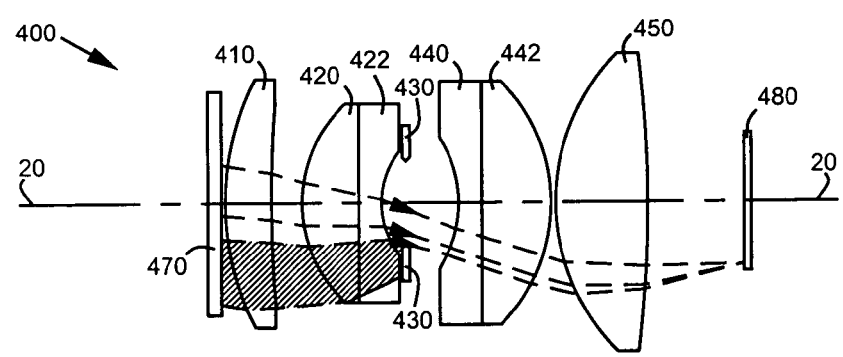

Reference is made to FIGS. 12A-12C, which are schematic sectional view of this same embodiment 400, taken along the optical axis 20 in the plane perpendicular to the direction of dispersion. In operation and referring to FIG. 12A, light incident on the optical system from an angular direction non-parallel to the optical axis 20 is imaged through the un-obscured portion of the optical sub-system 405 onto the reflective slit element 460. Referring to FIG. 12B, a portion of the reflected light is obscured by the optical stop 430 (also referred to as an aperture that limits the throughput), while the remaining reflected light is then substantially collimated as it passes a second time through the same optical sub-system 405 onto the reflective dispersing element 470. Referring to FIG. 12C, a portion of this dispersed light is obscured by the optical stop 430, while the remaining dispersed light is then imaged as it passes a third time through the same optical sub-system 405 onto the image surface 480.

The embodiments of the hyperspectral imaging system of this invention shown in FIGS. 1-12 include optical sub-systems 100, 200 including both reflective surfaces and refractive optical elements (the catadioptric systems shown in FIGS. 1-6) and optical sub-systems 300, 400 including refractive optical elements. The hyperspectral imaging system of this invention includes a reflective slit element (170 in FIG. 1, 250 in FIG. 4, 370 in FIG. 7, 460 in FIG. 10), at least one detecting element (190 in FIG. 1, 270 in FIG. 4, 390 in FIG. 7, 480 in FIG. 10), means for angularly separating substantially collimated electromagnetic radiation according to its wavelength, and means for (a) imaging electromagnetic radiation emanating from a source onto said reflective slit element,
(b) substantially collimating the electromagnetic radiation emanating from the reflective slit element, and,
(c) imaging the angularly separated electromagnetic radiation onto said at least one detecting element.

The reflective dispersing element (180 in FIG. 1, 260 in FIG. 4, 380 in FIG. 7, 470 in FIG. 10) provides means for angularly separating substantially collimated electromagnetic radiation according to its wavelength. The optical sub-system (105 in FIG. 1, 202 in FIG. 4, 302 in FIG. 7, 405 in FIG. 10) provides means for (a) imaging electromagnetic radiation emanating from a source onto said reflective slit element,
(b) substantially collimating the electromagnetic radiation emanating from the reflective slit element, and,
(c) imaging the angularly separated electromagnetic radiation onto said at least one detecting element.

It should be noted that although embodiments of the optical sub-system including both reflective surfaces and refractive optical elements and embodiments including refractive optical elements have been shown, other equivalent embodiments are possible.

Although the invention has been described with respect to various embodiments, it should be realized this invention is also capable of a wide variety of further and other embodiments within the spirit and scope of the appended claims.

What is claimed is:

1. A hyperspectral imaging system comprising:
   an optical sub-system;
   a reflective slit element;
   said optical sub-system being capable of imaging, onto said reflective slit element, electromagnetic radiation emanating from a source;
   said optical sub-system also being capable of substantially collimating, at a front plane, electromagnetic radiation emanating from said reflective slit element;
   a reflective dispersive element located substantially at the front plane;
   said optical sub-system also being capable of imaging, at an image surface, reflected, dispersed electromagnetic radiation from said reflective dispersive element; and,
   a detecting element located substantially at the image surface;
   said detecting element being capable of detecting reflected dispersed electromagnetic radiation reflected from said reflective dispersive element;
   said reflective slit element and said detecting element being optically disposed to receive electromagnetic radiation from a same surface of said optical sub-system.

2. The hyperspectral imaging system of claim 1 wherein said optical sub-system comprises a catadioptric optical sub-system.

3. The hyperspectral imaging system of claim 2 wherein said optical sub-system further comprises a field-limiting aperture optically disposed within said catadioptric optical sub-system.

4. A hyperspectral imaging system comprising:
   an optical sub-system;
   a reflective slit element;
   said optical sub-system being capable of imaging, onto said reflective slit element, electromagnetic radiation emanating from a source;
   said optical sub-system also being capable of substantially collimating, at a front plane, electromagnetic radiation emanating from said reflective slit element;
   a reflective dispersive element located substantially at the front plane;
   said optical sub-system also being capable of imaging, at an image surface, reflected, dispersed electromagnetic radiation from said reflective dispersive element; and
   a detecting element located substantially at the image surface;
   said detecting element being capable of detecting reflected dispersed electromagnetic radiation reflected from said reflective dispersive element;
   wherein said optical sub-system comprises a catadioptric optical sub-system; and
   wherein said optical sub-system further comprises:
   a first group of optical elements;
   said first group of optical elements comprising at least one refractive optical element;
   a second group of optical elements;
   said second group of optical elements comprising at least one reflective surface;
   said first group of optical elements being capable of transmitting the electromagnetic radiation emanating from the source to said second group;
   a third group of optical elements substantially centered with respect to said first group of optical elements;
   said third group of optical elements comprising at least one reflective surface;
   said second group of optical elements being capable of reflecting, to said third group of optical elements, the electromagnetic radiation transmitted by said first group of optical elements;
   a fourth group of optical elements substantially centered with respect to said second group of optical elements;
   said fourth group of optical elements comprising at least one refractive optical element; and,
   said third group of optical elements being capable of reflecting, to said fourth group of optical elements, the electromagnetic radiation transmitted by said second group of optical elements;
   said fourth group of optical elements being capable of focusing, at the image surface, the electromagnetic radiation reflected by said third group of optical elements.

5. The hyperspectral imaging system of claim 4 wherein said fourth group of optical elements comprises:
- a first sub-group of optical elements;
    - said first sub-group of optical elements comprising at least one refractive optical element;
- a second sub-group of optical elements;
    - said second sub-group of optical elements comprising at least one refractive optical element;
- said first sub-group of optical elements being capable of transmitting, to said second sub-group of optical elements, the electromagnetic radiation transmitted by said third group of optical elements;
- said second sub-group of optical elements being capable of focusing, at the intermediate image surface, the electromagnetic radiation transmitted by said first sub-group of optical elements.

6. The hyperspectral imaging system of claim 5 wherein said optical sub-system further comprises an aperture optically disposed between said first sub-group and said second sub-group.

7. The hyperspectral imaging system of claim 5 wherein said aperture is a limiting aperture.

8. The hyperspectral imaging system of claim 4 wherein the at least one reflective surface in said third group of optical elements is a surface proximate to the source.

9. The hyperspectral imaging system of claim 4 wherein the at least one reflective surface in said third group of optical elements is a surface proximate to said fourth group of optical elements.

10. A hyperspectral imaging system comprising:
- an optical sub-system;
- a reflective slit element;
    - said optical sub-system being capable of imaging, onto said reflective slit element, electromagnetic radiation emanating from a source;
    - said optical sub-system also being capable of substantially collimating, at a front plane, electromagnetic radiation emanating from said reflective slit element;
- a reflective dispersive element located substantially at the front plane;
    - said optical sub-system also being capable of imaging, at an image surface, reflected, dispersed electromagnetic radiation from said reflective dispersive element; and
- a detecting element located substantially at the image surface;
    - said detecting element being capable of detecting reflected dispersed electromagnetic radiation reflected from said reflective dispersive element;
- wherein said optical sub-system comprises:
- a group of refractive optical elements;
- said reflective dispersive element being positioned to obscure a portion of the electromagnetic radiation emanating from the source.

11. The hyperspectral imaging system of claim 10 wherein said optical sub-system further comprises an optical stop optically disposed between the source and said group of refractive optical elements.

12. The hyperspectral imaging system of claim 10 wherein said optical sub-system comprises:
- a first sub-group of refractive optical elements capable of receiving the electromagnetic radiation emanating from the source and transmitting the electromagnetic radiation therefrom;
- a second sub-group of refractive optical elements optically disposed to receive the electromagnetic radiation transmitted by said first sub-group of refractive optical elements; and,
- an aperture optically disposed between said first sub-group and said second sub-group refractive optical elements.

13. A method for detecting wavelength dependent content of electromagnetic radiation, the method comprising the steps of:
- substantially imaging, by propagating a first time through an optical system, electromagnetic radiation originating at a source onto a reflective slit element such that electromagnetic radiation emanates therefrom;
- substantially collimating, by propagating a second time through said optical system, the electromagnetic radiation emanating from the reflective slit element;
- angularly separating the substantially collimated electromagnetic radiation according to its wavelength;
- substantially imaging, by propagating a third time through said optical system, the angularly separated electromagnetic radiation onto at least one detecting element; and,
- detecting the angularly separated electromagnetic radiation.

14. A hyperspectral imaging system comprising:
- a reflective slit element;
- at least one detecting element;
- means for angularly separating substantially collimated electromagnetic radiation according to its wavelength;
    - a means for imaging electronic radiation emanating from a source onto said reflective slit element;
    - a means for substantially collimating the electromagnetic radiation emanating from the reflective slit element; and
    - a means for imaging the angularly separated electromagnetic radiation onto said at least one detecting element.

* * * * *